United States Patent [19]
Padula

[11] Patent Number: 5,055,831
[45] Date of Patent: Oct. 8, 1991

[54] CURSOR FOR DIGITIZER TABLET

[75] Inventor: Michael J. Padula, Sandy Hook, Conn.

[73] Assignee: Summagraphics Corporation, Seymour, Conn.

[21] Appl. No.: 418,088

[22] Filed: Oct. 6, 1989

[51] Int. Cl.[5] .............................................. G09G 3/02
[52] U.S. Cl. ..................................... 340/706; 178/18; 33/1 M
[58] Field of Search ...................... 340/710, 709, 706; 178/18, 19; 33/1 M

[56] References Cited

U.S. PATENT DOCUMENTS

| | | | |
|---|---|---|---|
| 4,600,807 | 7/1986 | Kable | 178/19 |
| 4,639,547 | 1/1987 | Jacob-Grinschgl et al. | 178/18 |
| 4,705,572 | 11/1987 | Kable et al. | 178/18 |
| 4,827,086 | 5/1989 | Rockwell | 340/710 |
| 4,933,671 | 6/1990 | McCourt | 340/710 |

*Primary Examiner*—Alvin E. Oberley
*Assistant Examiner*—Xlao Min Wu
*Attorney, Agent, or Firm*—Rosen, Dainow & Jacobs

[57] ABSTRACT

A novel cursor construction for a digitizer tablet, wherein the cursor coil is wound on a one-sided bobbin which is then seated in a blind hole of a transparent base, with a crosshair molded into the base and aligned with the coil.

9 Claims, 3 Drawing Sheets

CURSOR FOR DIGITIZER TABLET

This invention relates to cursors for digitizer tablets.

BACKGROUND OF THE INVENTION

Digitizer tablets are well known input devices for computers. A typical construction employs planar electrodes embedded in the tablet surface just below its working surface cooperating with a pointing device on the surface. The pointing device may be in the form of a stylus, pen or cursor, and may contain a coil or similar device and frequently button switches. For tracing drawings accurately, the cursor is preferred. It has the general appearance of an elongated mouse, with a projecting transparent plate in front (sometimes in the center) containing a crosshair surrounded by a coil or similar device. In a typical use, the electrodes are activated generating electromagnetic fields that induce signals in the coil. The signals when processed output data representative of the X and Y coordinate positions of the coil center on the tablet surface. The accuracy of the data is in part determined by the perfection of the coil and coincidence of the crosshair with the coil center. The user uses the crosshair to trace the drawing or other pattern desired, and the data input to the computer depends on the alignment of the coil and crosshair.

A common way to manufacture the cursor is to premold a transparent plastic plate, to serve as the base for the housing and switches, and as a support for the coil and crosshair. The premold includes a circular through-hole. The coil is wound in a flat pancake form on a double-sided bobbin, and then placed in the hole so that one bobbin side lies in the same plane as the plate bottom. The bobbin has a depth approximately equal to that of the hole. The crosshair is preformed on one side of the bobbin. The bobbin is glued in place after it is manually rotated so that the crosshair is exactly in line with grooves formed in, and extending along the longitudinal axis of, the plate.

This known method exhibits several drawbacks. The first is cost. The manual assembly and alignment of crosshair with plate grooves is relatively expensive. The second drawback is that exceptional care is necessary to ensure that the mechanical center of the crosshair matches the electrical center of the coil. A third drawback is that the level of electrostatic discharge resistance (ESD) while adequate could be enhanced.

SUMMARY OF THE INVENTION

An object of the invention is an improved cursor construction for a digitizer tablet.

Another object of the invention is a cursor construction capable of lower cost manufacture.

A further object of the invention is a cursor construction with improved performance for use with a digitizer tablet.

These and other objects and advantages of the invention are achieved with a novel cursor construction based on the use of a one-sided bobbin for the coil instead of the double-sided bobbin conventionally employed. It surprisingly turns out that not only are manufacturing costs reduced, but in addition a cursor with improved performance results.

In a preferred embodiment, the transparent support plate for the coil is provided with a blind hole for receiving the coil wound on its one-sided bobbin.

In a further preferred embodiment, the crosshair is molded or cut into the plastic portion underlying the blind hole at the same time as the grooves are formed, so that perfect alignment is achieved.

SUMMARY OF DRAWINGS

The invention will now be described in greater detail with respect to a preferred embodiment, reference being had to the accompanying drawings wherein.

DETAILED DESCRIPTION OF PREFERRED EMBODIMENT

Figure 3:
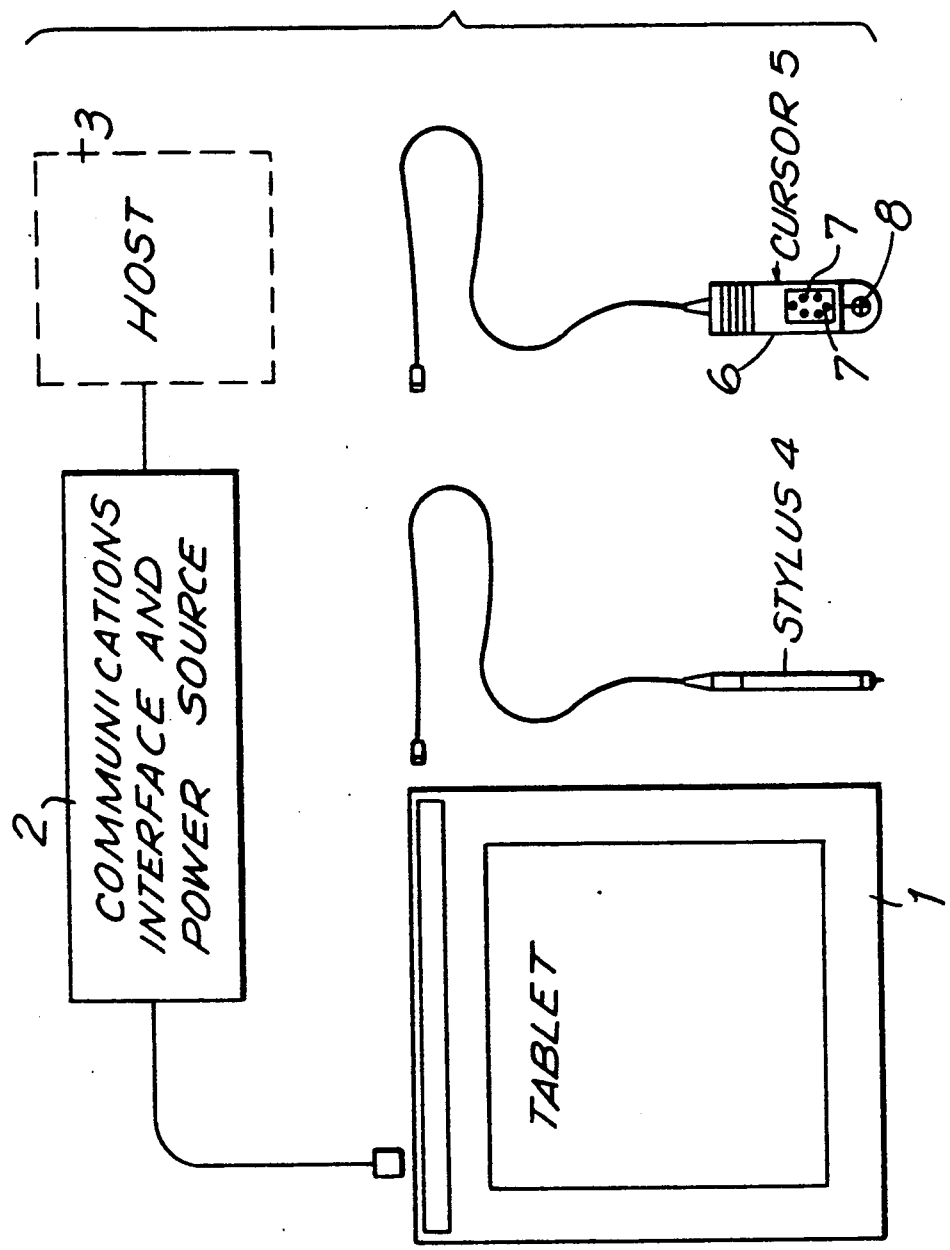
FIG. 3 a typical hardware configuration for a tablet with several pointing devices.

To show the environment of the invention, reference is first made to FIG. 3, which schematically illustrates a typical hardware configuration comprising a tablet 1 connected by way of a data link and a communications interface 2 to a host computer 3. Connected to the tablet is a stylus 4, or a cursor 5 with which the invention is concerned. The cursor 5 is a hand-held device used for drawing on the tablet 1. The typical cursor comprises a housing 6 with button switches 7 and a crosshair 8 to enable the user to accurately position the interacting component, in this case, an electric coil (not shown in FIG. 3, but concentric with the crosshair), over the drawing being traced.

The typical known cursor comprises a base plate having a projecting-forwardly, transparent part containing the crosshair and coil, and a housing for the button switches and other circuitry. Since the invention is concerned primarily with the construction and assembly of the coil and crosshair, the remaining parts of the cursor will not be described in detail, since they can be the same in the invention as in the known constructions.

Figs. 1A-D illustrate the known configuration of the base plate and coil. The base plate shown at 10 comprises a transparent plastic plate 11, usually of clear acrylic, with a forwardly projecting portion 12 containing grooves 13 molded or cut into the material and aligned with the longitudinal axis 14 of the plate. A through-hole 15 is molded into the plate 11 to receive the coil 16 which is wound on a double-sided bobbin (H-cross-section) 17, also of clear plastic. The bottom 18 of the bobbin is provided with a molded or cut crosshair 19. The cursor is assembled by placing the bobbin 17 with coil 16 into the hole 15 and securing in place, typically by ultrasonic bonding. Before securing, the bobbin must be rotationally aligned so that its crosshair 19 is exactly aligned with the grooves 13 in the base plate. This is done manually, and doesn't always result in perfect alignment.

Figure 1A:
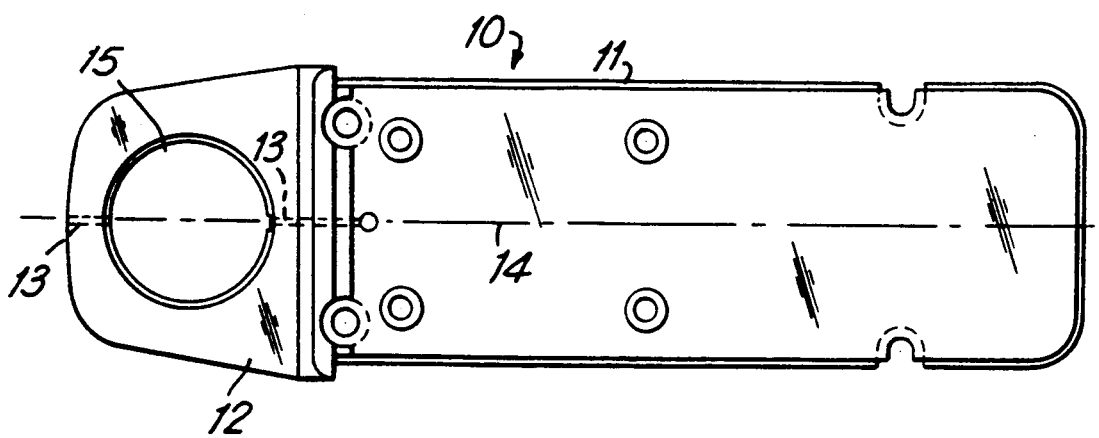
FIGS. 1A is a plan view of the base plate of a known cursor.
Figure 1B:
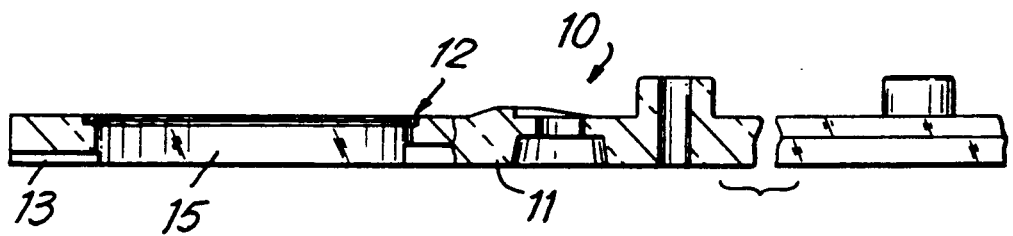
FIG. 1B is a cross-sectional view along its longitudinal axis of the base of FIG. 1A.
Figure 1C:
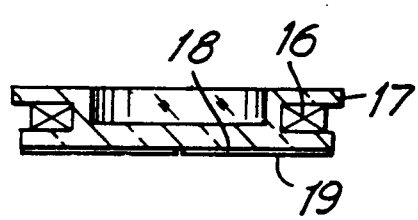
FIG. 1C is a cross-section of a two-sided bobbin for assembly in the base of FIG. 1A.
Figure 1D:
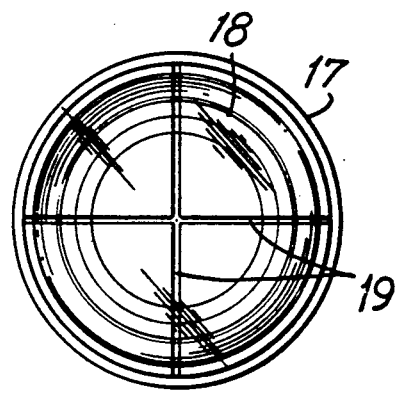
FIG. 1D is a bottom view of the bobbin.
Figure 2A:
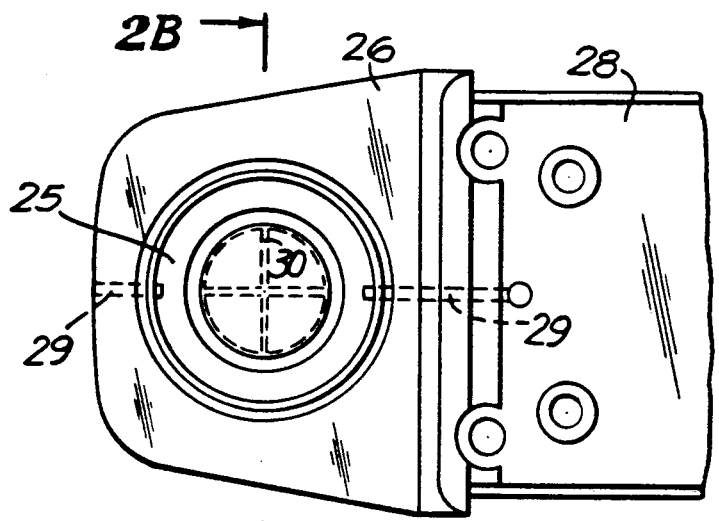
FIG. 2A is a plan view similar to FIG. 1A of one form of construction according to the invention.
Figure 2B:
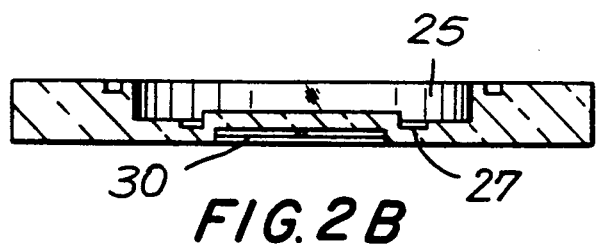
FIG. 2B is a cross-section along line 2B of FIG. 2A.
Figure 2C:
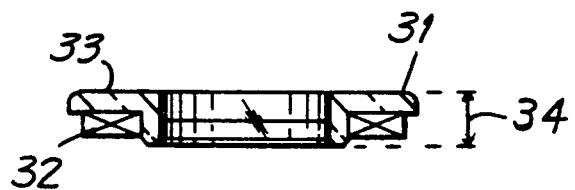
FIG. 2C is a cross-section of the one-sided bobbin for use with the base plate of FIG. 2A.
Figure 2D:
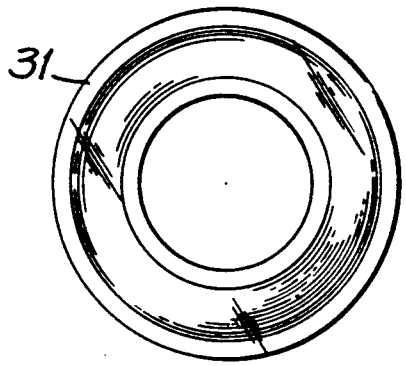
FIG. 2D is a top view of the bobbin of FIG. 2C.

The improved construction is shown in FIGS. 2A-D. FIG. 2A corresponds to FIG. 1A. FIG. 2B is a cross-section along line 2B-2B. The major difference is that a blind hole 25 is formed in the forwardly projecting part 26 of transparent base plate 28. The bottom 27 of the hole is closed off by a solid integral part of the base plate 28. The same grooves 29 corresponding to grooves 13 are formed in the projecting part simultaneously with a crosshair 30 formed in the bottom part 27. These can be formed by molding or cutting, and being formed simultaneously can be perfectly aligned. The bobbin 31 in the invention is one-sided (L-cross-section), and the coil 32 wound on it. The unit is assembled by placing, as before, the bobbin 31 with coil 32 into the hole 25, with one side 33 of the bobbin facing outwardly (upwardly when the cursor is in use). Since the coil electrical center is automatically aligned with the mechanical center of the bobbin, and the latter can be accurately fitted into and aligned with the hole 25 in the base plate, a perfect match is obtained. Rotational alignment is automatic, since the coil is circular symmetric in a circular symmetric hole, and the crosshair 30 has already been aligned with the grooves 29.

This coil winding process on the one-sided bobbin as such is known. During the coil winding process, a fixture on the machine serves as the second bobbin side, and adhesive is provided on the wire so that after the winding is complete, heat can be applied to activate the adhesive and thus fix the coil shape and also bond it to the bobbin which can then be removed from the machine. Alternatively, a chemical such as an alcohol can be applied to activate the wire coating to cause adhesion. The bobbin 31 with coil 32 is then placed in the hole 25, with the one bobbin side 33 up, and bonded in place, as before by ultrasonic bonding. The depth or thickness of the bobbin, indicated by 34, is approximately equal to the hole depth. Since the crosshair 30 and grooves 29 had been accurately premolded or cut into the plate 26 and plate part 27 underlying the hole, with a reasonably accurate molded hole 25 and a reasonably accurate molded bobbin 31, mere placing of the coil-mounted bobbin 31 into the hole 25 automatically matches the electrical center with the mechanical center of the assembly.

It turns out that molding the crosshairs into the plastic base, accurately aligned with the molded grooves, is readily accomplished at little if any increased tool cost. Moreover, it turns out to be much less expensive to builds a mold for an L-section bobbin than an H-section bobbin, and the molding cycle time for the part is shorter. The assembly time is also reduced, all of which contribute to reduced costs.

In addition, improved cursor performance is achieved. As already mentioned, better matching of the electrical and mechanical centers results in improved rotational accuracy which reduces the tolerances to a little as 3-4 counts (the tablet raw data output is in counts — with, say, a resolution of 500 lines per inch, the tablet outputs 500 counts for each inch of cursor position movement from the origin). Moreover, ESD (Electrostatic Discharge) immunity is enhanced, due primarily to a solid bottom of the plate underlying the coil.

The overall thickness of the plastic plate 28 remains the same. Reducing the bobbin thickness by eliminating one side avoids the need to change plate thickness. Thus, the overall weight of the assembly remains unchanged.

There has thus been described a new cursor construction providing reduced tooling costs, reduced assembly costs, reduced complexity, while at the same time affording improved electrical performance when used with a digitizer tablet.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A cursor construction for use with a digitizer tablet, comprising:
    (a) a base member having a continuous transparent bottom surface, said base member having a top opening with a portion of the transparent surface extending underneath the opening,
    (c) a separate bobbin having a flange on one side,
    (d) a coil wound on said bobbin,
    (e) said coil-mounted bobbin seated in said opening such that the bobbin flange is adjacent the top opening spaced from the transparent bottom surface,
    (f) a crosshair in said transparent bottom surface and aligned with the coil.

2. A cursor construction for use with a digitizer tablet, comprising:
    (a) a base member for supporting a hand-held housing mounted on said base member,
    (b) a transparent member integrally connected to said base member, said transparent member having a blind hole,
    (c) a separate one-sided bobbin comprising a ring-shaped member flanged on one side,
    (d) a coil wound on the ring-shaped member resting on the flanged side and of a height which is not greater than the spacing between the flanged side and the opposite side of the ring-shaped member,
    (e) said ring-shaped member with wound coil being seated in the blind hole and adhered in that position to the transparent member,
    (f) a crosshair in said transparent member and aligned with the coil center.

3. A cursor construction as claimed in claim 2, wherein the transparent member is provided with a longitudinally extending groove aligned with the crosshair.

4. A cursor construction as claimed in claim 3, wherein the bobbin flanged side is positioned adjacent the open side of the blind hole.

5. A cursor construction as claimed in claim 2, wherein the crosshair is molded into the portion of the transparent member underlying the blind hole.

6. A cursor construction as claimed in claim 5, wherein the bobbin is positioned such that its one side faces upward.

7. A cursor construction as claimed in claim 6, wherein the bobbin thickness is approximately equal to the hole depth.

8. A cursor construction as claimed in claim 5, wherein a groove is molded into the transparent member laterally offset from the bobbin, said groove being aligned with the crosshair.

9. A cursor construction as claimed in claim 2, wherein the transparent member projects forwardly of the housing.

* * * * *